(12) United States Patent
Leon et al.

(10) Patent No.: US 8,596,349 B2
(45) Date of Patent: *Dec. 3, 2013

(54) PULSE FRACTURING DEVICE AND METHOD

(75) Inventors: Jean-Francis Leon, Le Bouscat (FR); Joseph Henry Fram, Bakersfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,905

(22) Filed: Jul. 13, 2012

(65) Prior Publication Data

US 2012/0279713 A1 Nov. 8, 2012

Related U.S. Application Data

(63) Continuation of application No. 12/277,515, filed on Nov. 25, 2008, now Pat. No. 8,220,537.

(60) Provisional application No. 61/004,773, filed on Nov. 30, 2007.

(51) Int. Cl.
*E21B 28/00* (2006.01)

(52) U.S. Cl.
USPC ........................................................ 166/177.1

(58) Field of Classification Search
USPC ................ 166/281, 177.5, 259, 308.1, 272.1, 166/177.1
See application file for complete search history.

(56) References Cited

U.S. PATENT DOCUMENTS

| | | |
|---|---|---|
| 1,861,332 A | 5/1932 | Waitz |
| 2,871,943 A | 2/1959 | Bodine |
| 3,016,095 A | 1/1962 | Bodine |
| 3,386,507 A | 6/1968 | Lumpkin |
| 3,500,942 A | 3/1970 | Smith, Jr. |
| 3,700,169 A | 10/1972 | Naydan et al. |
| 3,822,747 A | 7/1974 | Maguire |
| 3,842,907 A | 10/1974 | Baker et al. |
| 3,923,099 A | 12/1975 | Brandon |
| 3,965,982 A | 6/1976 | Medlin |
| 3,990,512 A | 11/1976 | Kuris |
| 4,169,503 A | 10/1979 | Scott |
| 4,345,650 A | 8/1982 | Wesley |
| 4,471,838 A | 9/1984 | Bodine |
| 4,479,680 A | 10/1984 | Wesley et al. |
| 5,004,050 A | 4/1991 | Sizonenko et al. |
| 5,282,508 A | 2/1994 | Ellingsen et al. |
| 5,301,169 A | 4/1994 | Baria et al. |
| 5,948,171 A | 9/1999 | Grothaus |
| 6,215,734 B1 | 4/2001 | Moeny et al. |
| 6,227,293 B1 | 5/2001 | Huffman et al. |
| 6,427,774 B2 | 8/2002 | Thomas et al. |
| 7,677,673 B2 | 3/2010 | Tranquilla et al. |
| 2007/0175502 A1 | 8/2007 | Sliwa et al. |

OTHER PUBLICATIONS

International Search Report and Written Opinion for PCT International Patent Application No. PCT/US2008/084662, mailed on May 16, 2011.

International Preliminary Report on Patentability for PCT International Patent Application No. PCT/US2008/084662, mailed on Jun. 3, 2011.

*Primary Examiner* — William P Neuder
*Assistant Examiner* — Kipp Wallace

(57) ABSTRACT

A method of inducing fracture in at least a portion of a geologic structure includes inducing acoustic waves into a fluid medium present in a borehole extending at least partially into the structure. Embodiments may include preheating or pressurizing the fluid medium prior to inducing the acoustic wave therein.

14 Claims, 3 Drawing Sheets

PULSE FRACTURING DEVICE AND METHOD

This application claims priority to U.S. Provisional Patent Application 61/004,773 filed Nov. 30, 2007, and is a continuation of U.S. patent application Ser. No. 12/277,515, the contents of each of which are hereby incorporated by reference in their entirety.

BACKGROUND OF THE INVENTION

1. Field of the Invention

The present invention relates generally to recovery of subterranean resources and more particularly to inducing fracture in geological structures by generation of pressure waves in a fluid medium in a borehole extending at least partially into the geological structures.

2. Description of the Related Art

Fracture of a region surrounding a borehole can allow for improved efficiency of oil recovery in certain types of formations. Conventionally, fracture in the geologic structure has been produced by generation of hydraulic pressure, which may be a static or quasi-static pressure generated in a fluid in the borehole. Another conventional method has included generation of a shock in conjunction with a hydraulic wave by creating an electrical discharge across a spark gap.

SUMMARY OF THE INVENTION

Aspects of embodiments of the present invention provide a method of inducing fracture in at least a portion of a geologic structure, the method including generating an acoustic wave in a fluid medium present in a borehole penetrating at least partially into the geologic structure, the acoustic wave having frequency, duration and amplitude sufficient to induce fracture in the portion of the geologic structure and at least at a boundary between the fluid and the structure, the acoustic wave is an ordinary acoustic wave (i.e., not a shock wave).

An aspect of embodiments of the present invention may include, prior to the generating, pressurizing the fluid in the borehole to a pressure below a threshold pressure above which the geologic structure would fracture and heating the fluid to a temperature below a boiling point of the fluid at the pressure.

An aspect of embodiments of the present invention includes a device for inducing fracture in at least a portion of a geologic structure adjacent a borehole, the device including an upper packer and a lower packer, which, when the device is placed within the borehole, together with the sides of the borehole, define a confined volume, a pair of electrodes, disposed between the upper and lower packer and defining a spark gap between the pair of electrodes, a power supply, in electrical communication with the electrodes and configured and arranged to generate a spark in the spark gap, a pump, communicable to the confined volume and configured and arranged to generate a pressure in the confined volume when the device is in use, and a heater, configured and arranged to heat a fluid medium present in the confined volume when the device is in use.

Aspects of embodiments of the invention may include a computer readable medium encoded with computer executable instructions for performing the foregoing method or for controlling the foregoing device.

Aspects of embodiments of the invention may include a system incorporating the foregoing device and configured and arranged to provide control of the device in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EXEMPLARY EMBODIMENTS

Figure 1:
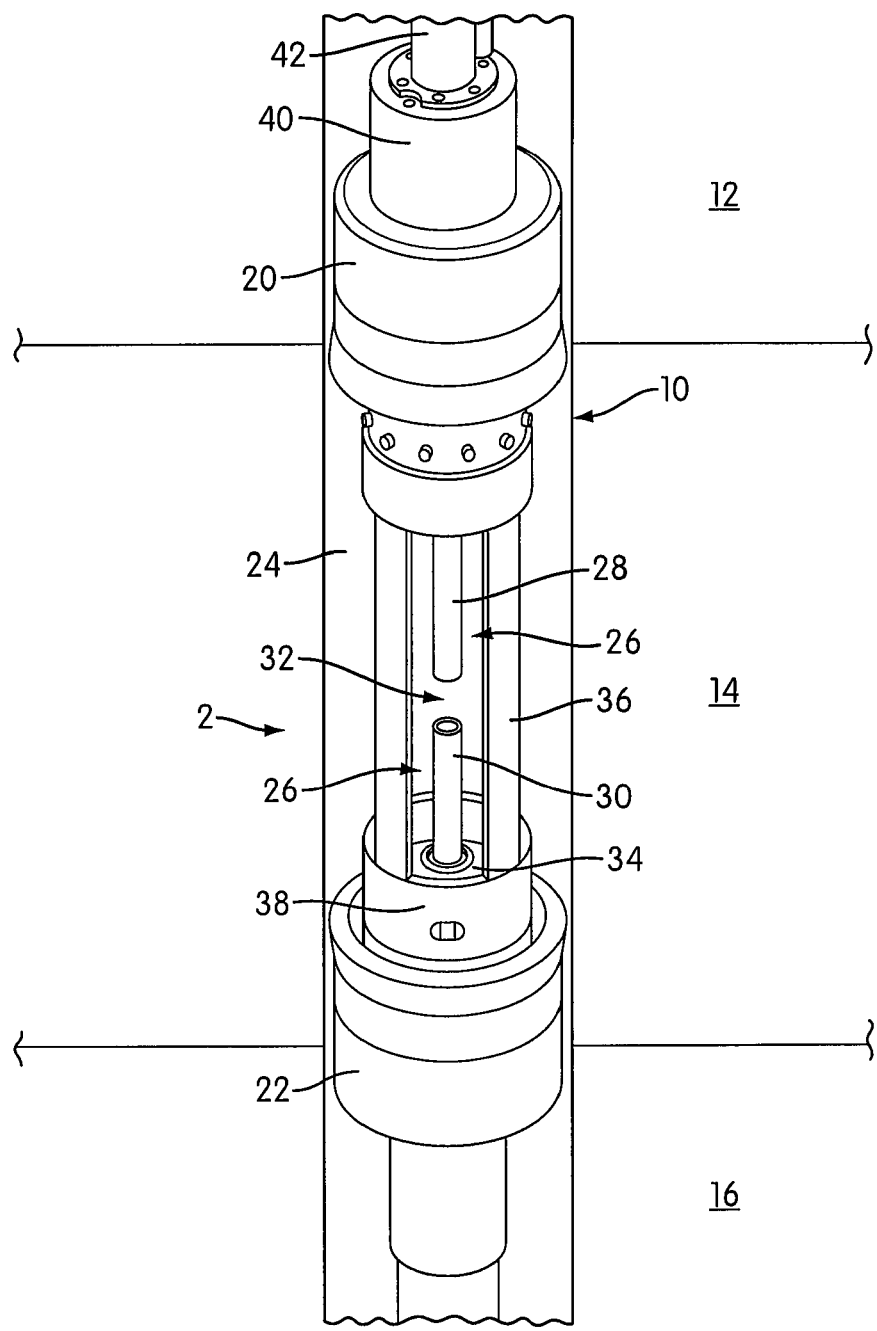
FIG. 1 illustrates an example of a device in accordance with an embodiment of the present invention.

FIG. 1 illustrates a fracture inducing device 2 in accordance with an embodiment of the present invention. A borehole 10 extends into a geological formation having a number of layers 12, 14, 16 defined therein. By way of example, layer 14 may have been identified as providing access to subterranean resources such as petroleum resources and therefore it may be useful to induce fracture to allow increased ease of access to those resources.

The fracture inducing device 2 includes a pair of packers 20, 22 that act to confine a volume of fluid 24 within a portion of the borehole adjacent to a portion of the layer 14 that is set to undergo fracture. By way of example, the packers may be separated by about 2 to 3 feet. In embodiments, these packers 20, 22 engage walls of the borehole 10 with sufficiently good conformity, and are sufficiently stiff, that a pressure within the volume of fluid 24 may be raised above an ambient pressure in the borehole. Thus, the packers together define an approximately cylindrical volume having a height on the order of a few feet and a diameter equal to the diameter of the borehole which is typically on the order of 4" to 12".

Between the packers 20, 22, a high voltage electrode 26 extends along an axis of the borehole 10. As shown in FIG. 1, the electrode 26 includes an upper electrode 28 and a lower electrode 30. A distance between the upper and lower electrodes 28, 30 constitutes a spark gap 32 in which a spark may be generated by applying a large voltage across the electrodes 28, 30 such that a breakdown voltage of the fluid in the volume 24 is exceeded.

The lower electrode 30 includes a high voltage insulating ring 34 around its base. Furthermore, a number of rods 36, which may be, for example, hollow metallic rods, extend between the upper and lower packers and may be said to define an outer envelope of the spark generator.

The lower electrode 30, may be in electrical communication with a conducting plate 38 that in turn is in electrical communication with the lower packer 22. The rods 36 may likewise be in electrical communication with the plate 38 (and therefore the lower packer and the lower electrode). Additionally, a conducting ring 40 may be in electrical communication with upper portions of the rods 36, further ensuring that the rods 36 maintain a common voltage potential. As will be appreciated, the conducting ring 40 and rods 36 are isolated from the upper electrode 28 by the insulating ring 34 described above. As will be further appreciated, the insulating ring 34 should be designed (i.e., the material and dimensions should be selected) to have a breakdown voltage sufficiently larger than a breakdown voltage of the fluid between the electrodes so that the spark gap arcs without failure of the insulator.

In embodiments where the rods 36 are constructed as hollow tubes extending through the upper packer 20, they may be used to provide a number of additional functions. For example, one or more of the rods may include a port allowing for fluid circulation within the confined volume between the two packers. An upper end of one or more of the rods may include a gas flow port allowing accumulated gas to escape the confined volume. Likewise, the hollow tubes may allow for insertion of sensors such as flow sensors, pressure sensors, temperature sensors or the like into the volume.

It may be useful to include a sensor for measuring a separation between the upper and lower electrodes 28, 30. During operation, the electrodes may be partially consumed by the arc discharge, generally increasing a separation distance between them over time. As separation becomes larger, one or both of the electrodes may be extended towards the other. In a particular embodiment, one or both of the electrodes are rods that may be extended into the gap as they are consumed. In this regard, it may be useful to include the upper electrode as a rod or length of wire that can be fed through the upper packer into the spark gap either continuously or periodically as it is consumed through spark generation.

Furthermore, because consumption of the upper and lower electrodes may be uneven, it may be useful to configure both electrodes as extendible electrodes, allowing for control both of the gap length and gap location. In this configuration, the lower electrode would likewise comprise a length of rod or wire that can be fed through the lower packer into the spark gap, similar to the upper electrode. In a typical embodiment, the total length of the consumable portion of each electrode may be on the order of tens of feet, for example, to allow use over an extended period of time.

A cable 42, or tubing (not shown), may be provided for transport of the fracture inducing device 2. The cable may be, for example, similar to a typical wireline used for remote sensing of conditions in the borehole. The cable 42 may include utilities such as electrical power and/or control for the fracture inducing device 2 and conduits for conducting fluid to the confined volume or for returning fluid or gases from the confined volume to allow for analysis where applicable. In embodiments, as described below, the conduits may be used to conduct hot, pressurized fluid to the confined volume and to allow circulation of fluid from the confined volume to the surface. The conduits may also include capability for transport of hydraulic signals for control of the device 2 (for example, including hydraulic control of extension of the electrode as it is consumed).

Figure 2:
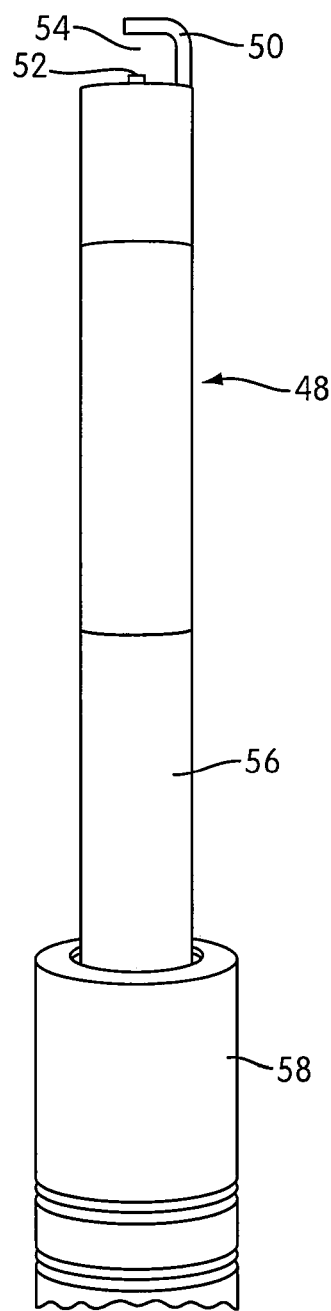
FIG. 2 illustrates an alternate electrode configuration in accordance with embodiments of the present invention.

FIG. 2 illustrates an alternate electrode configuration 48, similar in configuration to a spark plug, that may be used in accordance with various embodiments of the invention. In the electrode of FIG. 2, in place of the upper and lower electrodes, an outer electrode 50 and a central electrode 52 together define a spark gap 54. In this configuration, an insulating sleeve 56 (for example, nylon) surrounds the central electrode 52 and insulates it from the outer electrode 50. The outer electrode may be in electrical communication with a ground, for example via a conductive portion 58 of a base of the electrode.

Figure 3:
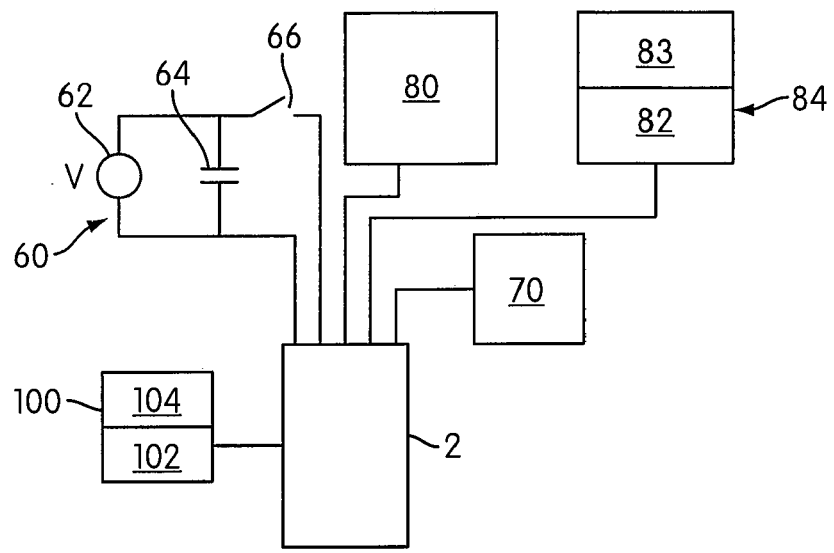
FIG. 3 schematically illustrates an example of a device in accordance with an embodiment of the present invention, and including an electrical and a hydraulic subsystem thereof.

FIG. 3 schematically illustrates the device 2 of FIG. 1 along with additional components that provide additional functionality. Though not explicitly shown in the schematic, the additional components may be located remote from the device. This has the effect of removing the active components from the borehole where they would potentially be exposed to high pressures, temperatures, and electromagnetic pulse effects developed during the spark discharge Likewise, certain of the components may be co-located with the device consistent with embodiments of the present invention.

An electrical system 60 is in electrical communication with the device 2 in order to energize the electrodes. The electrical system 60 includes a power supply 62 that may be, for example, a high voltage DC power supply. The power supply 62 charges an energy storage component, such as a capacitor bank 64 in order to store energy for delivery to the electrodes in the range of hundreds of kJ per pulse, for example, between about 100 kJ and about 200 kJ. A high voltage switch 66 is actuatable in order to discharge the capacitor bank 64, and to send energy to the electrodes 28, 30.

A secondary electrical system 70 provides pulsed power for initiating the pulse discharge between the electrodes. In operation, the electrical system 60 is used to develop a small current between the electrodes over a time frame of approximately 10-100 ms. This current, which may, for example, be in the range from approximately 1-10 A acts to pre-heat a portion of the fluid between the electrodes prior to initiation of spark. As the pre-heat cycle ends, the secondary electrical system 70 generates a high voltage impulse at the electrodes, inducing breakdown in the fluid between the electrodes and creating a relatively conducting path therethrough. Once the conducting channel is established, the capacitor bank 64 is able to discharge its energy across the gap, producing an arc discharge between the electrodes. The secondary electrical system may generate, for example, pulse energy between about 1% and 5% of the energy of the primary electrical system. The secondary electrical system may also be actuated at a relatively higher frequency (e.g., in the kHz range) than the primary electrical system, thereby allowing the spark discharge to be sustained for a relatively longer duration.

As an example, in a reduced scale application, for a spark gap of about 2 mm and a charging voltage of 1 kV, the approximate energy deposited into the water is about 60 J. For a 4 mm spark gap, this rises to about 120 J. In a borehole application, a useful range of energies is above about 1 kJ, and the energy may be controlled by variation in the charging voltage and/or changing the spark gap length. In general, charging voltage will be in the tens of kV, for example 20 kV for the primary circuit and 60 kV for the secondary.

The flow of current in the arc discharge results in resistive heating of the fluid between the electrodes. As the fluid is rapidly heated beyond its boiling point, it flashes to a gaseous state, creating a gas bubble in the fluid. The bubble may be, for example, on the order of a few cubic inches in volume (e.g., about 1 $in^3$-10 $in^3$) as it expands.

As will be appreciated, the fluid in the confined space is already under pressure prior to the generation of the gas bubble. The pressure may be due merely to the depth at which the fracture operation is taking place, or may be augmented by additionally induced pressure as described below. In either case, the gas bubble creates a large pressure impulse in the already pressurized bulk fluid as it expands. The pressure impulse propagates through the fluid to the fluid boundary with the borehole and deposits its energy into the surrounding rock formation. If the pressure impulse is at a pressure that exceeds a threshold pressure (dependent on the strength of the formation, but typically thousands of lb/in$^2$), the formation will undergo fracture. The power generated in the spark discharge may be in the approximate range of tens of megawatts to about a gigawatt.

An alternate application makes use of a pressure impulse smaller than the threshold pressure for the formation. By way of example, a total pressure (i.e., impulse plus static pressure) of less than about 10 MPa should not, in general, result in significant fracture in some structures. As will be appreciated, the pressure level sufficient to cause fracture can vary from structure to structure, and should be chosen with regard to the particular conditions of the region under interrogation. Under these conditions, a seismic impulse will be transmitted to the formation. Such an impulse may be used, for example, as a seismic source for interrogation of the surrounding region to produce seismic logs. In this embodiment, one or more receivers may be used to receive the modulated signal after it has passed through or reflected off of various features within the geologic region. A variety of migration algorithms may be applied to further analyze the seismic signals as would be understood by one of ordinary skill in the art.

The characteristics of the pressure wave may be controlled in order to maintain the acoustic wave in a non-shockwave state, at least at the boundary with the formation. That is, the pressure wave should be an ordinary acoustic wave rather than a shock wave. This can help to ensure that the pressure is applied relatively uniformly to the formation, and that the energy produced by the discharge is not entirely absorbed in a first-forming crack. As a result, fracture is relatively isotropic, rather than concentrated. In this regard, the acoustic wave is controlled to have a low frequency, and the gas bubble is controlled to be developed relatively slowly and to have a relatively long life. In this context, slow electrical discharge may be considered as a discharge wherein a current of the discharge squared is greater than 3% of a peak value of the current of the discharge squared for more than 100 μs. By way of example, the electrical discharge may be in the range of about 100 μs to about 5 ms.

At the end of the electrical pulse, the gas bubble will condense, reducing the pressure impulse towards zero. As will be appreciated, factors influencing the decay of the pressure impulse include cooling of the bubble, which is correlated with the difference between the bubble temperature and the ambient temperature (i.e., the temperature of the fluid medium), and any expansion of the confined volume. A primary mode of volume expansion of the confined volume is fracture of the surrounding formation, though other factors may include leakage between the packers and the borehole, or any leakage through the fluid or gas return system if one is present.

The electrical systems may be configured and arranged to be selectively operated to repeatedly energize the electrodes, for example at a rate of about 10 Hz. Repeated generation of gas bubbles and resulting pressure waves allows for fracture over a large volume. As noted above, it may be useful to maintain a position of the spark over time. As will be appreciated, by keeping the source of the pressure relatively consistent, the effectiveness of subsequent impulses may be improved.

As noted above, it may be useful to pre-pressurize the confined volume beyond the static column pressure at depth. In this case, a pump 80 is operable to provide a selected static pressure within the confined volume, acting as a pressure offset to the higher frequency fluctuations imposed by the impulses. The particular static pressure may be selected to be within about 10% of a known or expected strength of the formation surrounding the confined volume. During the operation, the static pressure may, in fact, be varied, though it will, in general be varied at a low frequency compared to the repetition rate of the pulse generation, e.g., less than about 1 Hz. The pump 80 may be in fluid communication with the confined volume by way of the utility conduits, or may be located proximate the device 2 and communicated thereto via, for example, a one-way valve arrangement in one or more of the hollow rods 36. In embodiments, an additional pump may be provided for providing pressure in the fluid column, outside the confined volume so that the gradient between the confined volume and its environment is reduced. In this case, it may be useful to keep the pressure outside the confined volume at a level lower than, but close to, the pressure within the volume.

In an embodiment, the temperature difference between the gas bubble and the ambient fluid medium may be controlled by increasing the ambient fluid temperature. In such an approach, a heater pump 82 (which may be separate as schematically shown, or may be the same pump as pump 80) may be associated with a fluid reservoir 83 and a heating system 84 for producing heated fluid. The heated fluid may be circulated within the confined volume, thereby providing temperature control therein. An alternate approach to heating the fluid in the volume would be to include a heating element locally within the confined volume, or to combine local and remote heating. It may be useful to provide the heated fluid at a pressure higher than the ambient pressure so that the heated fluid will tend to circulate out of the confined volume, the circulation providing improved mixing of the heated fluid with the ambient fluid for temperature control in the volume. Temperature of the fluid should be maintained below the boiling point of the fluid, to avoid generating vapor bubbles within the confined volume that may cause uncontrolled transient pressure variations.

In an alternate embodiment, the thermal cooling of the bubble may be controlled by continuous injection of hot pressurized water through one or both of the electrodes, or through a closely placed injection line. In this approach, no attempt is made to control the temperature of the bulk ambient water, but instead temperature is controlled only in the immediate vicinity of the gas bubble itself. A thermal gradient will be formed in the volume surrounding the bubble, helping to control the thermal conductive cooling rate. Such local heating and temperature control should provide similar results to a full-volume approach while significantly reducing the energy and water flow rate needed to maintain a given temperature in the active region.

While the selected temperature may vary in accordance with particular engineering requirements, it may be useful in general to maintain a temperature between about 95 and about 99% of the boiling point of the working fluid at the working depth. By way of example, under 400 m of water, the boiling point of water is about 250° C. so a working temperature in a water-filled borehole might be about 240° C.

Heating the fluid in the confined volume may have two useful results. First, as noted above, where the fluid is near its boiling point, the condensation of the gas bubble is relatively slowed, which may help to control the decay of the transient pressure. The inventor has determined that a bubble having a long lifetime may produce a relatively longer range propagation of the pressure impulse through the formation, which can result in fracture over a relatively large volume of the formation. This effect may also be a result of more of the pulse's energy being in the low frequency range. Second, where the fluid is near its boiling point, the spark discharge has less work to do on the fluid to heat it prior to reaching a temperature sufficient to generate the gas bubble, and the bubble may therefore be larger and better able to couple the energy of the spark discharge into the acoustic wave in the fluid.

Figure 4:
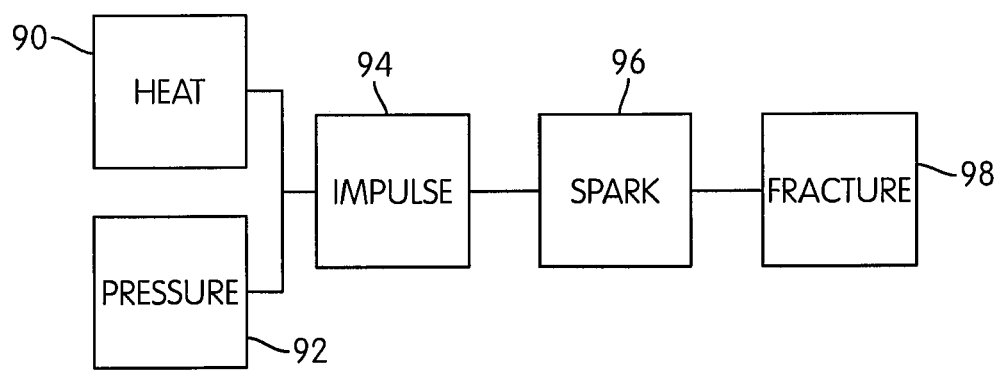
FIG. 4 is a flowchart illustrating acts of a method in accordance with an embodiment of the present invention.

FIG. 4 is a flow diagram illustrating acts constituting an embodiment of a method in accordance with the present invention. Fluid in the confined volume is heated 90, and pressurized 92. As should be appreciated, though shown as performed in parallel, these acts may alternately be performed serially and in either order. Once the fluid is heated and pressurized (though, as described above, these steps may optionally be omitted), an electrical impulse is generated 94, creating a spark discharge 96 across the spark gap. The spark discharge 96 induces a pressure wave in the fluid, causing fracture 98 in the formation though which the borehole extends.

In particular embodiments, the pressurized fluid may contain chemical additives (or the chemical additives may be separately conducted to the confined volume) to accelerate fracture rate. These additives may be introduced through the conduits, or may be introduced using a chemical additive injector located proximate or on-board the fracture inducing device 2. Such an injector 100 is schematically illustrated in FIG. 3 and includes a reservoir, 102, pump 104 and outlet that is in fluid communication with the confined volume at the fracture inducing device 2. One additive that may be useful for accelerating fracture is an aluminum-based material that undergoes an exothermic reaction when in contact with the steam/gas bubble generated during spark discharge. Such a reaction can be used to prolong the duration and strength of the pressure pulse, helping to produce the desired multidirectional and long-range fracturing Likewise, one of ordinary skill would appreciate that additives adapted to increase flow of hydrocarbon resources (such as diluents, surfactants and/or steam) may be introduced through the conduits in order to promote recovery activities.

While one important end use of a fracture process as described is the recovery of hydrocarbon resources, those of skill in the art may consider other potential uses. The result of the process is to produce a region of improved permeability. Thus, pulse fracture may find application in any number of processes that would benefit from improved permeability. For example, it may be useful to fracture a region of rock in a well that forms a part of a geothermal energy system, and in particular, in an enhanced geothermal system. In an enhanced geothermal system, a fluid is pumped through a region of hot, dry rock, where the fluid is heated and then returned to the surface for energy extraction. Fracture devices and methods in accordance with the present invention may be used to improve the permeability in the region in order to improve flow rates of the working fluid in the geothermal system. Other uses of interest may include groundwater well stimulation and waste injection operations.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of inducing fractures in at least a portion of a geologic structure, comprising:
   generating an acoustic wave in a fluid medium present in a borehole penetrating at least partially into the geologic structure, the acoustic wave being an ordinary acoustic wave having frequency, duration and amplitude sufficient for pressure to be applied relatively uniformly to the geologic structure to induce fractures in the portion of the geologic structure; and
   injecting pressurized fluid into a region proximate an electrode used to generate the acoustic wave wherein the injecting pressurized fluid comprises pressurizing the fluid in the borehole to a pressure below a threshold pressure above which the geologic structure would fracture prior to generating the acoustic wave;
   wherein within the pressurized fluid a gas bubble is formed expanding in volume inducing fractures in at least the portion of the geologic structure; and
   wherein the electrode is energized for a length of time greater than about 100 µs and at an energy of greater than about 1 kJ per pulse.

2. A method as in claim 1, further comprising, creating a temperature gradient in a portion of the fluid medium proximate the electrode and having a peak temperature below a boiling point of the fluid medium.

3. A method as in claim 2, wherein the temperature below the boiling point of the fluid is a temperature within about 10% of the boiling point of the fluid medium.

4. A method as in claim 1, wherein the pressurized fluid is a heated pressurized fluid and the injecting creates a temperature gradient in a portion of the fluid medium having a peak temperature below a boiling point of the fluid medium.

5. A method as in claim 4, wherein the fluid is injected through an aperture in or in an injection line proximate to the electrode.

6. A method as in claim 1, wherein the pressure below the threshold pressure is a pressure within about 10% of the threshold pressure.

7. A method as in claim 1, wherein the generating the acoustic wave comprises generating repeating spark discharges at a frequency below about 10 Hz to form expanding gas bubbles that create pressure impulses on the fluid.

8. A method of inducing fractures in at least a portion of a geologic structure, comprising:
   generating an acoustic wave in a fluid medium present in a borehole penetrating at least partially into the geologic structure, the acoustic wave being an ordinary acoustic wave having frequency, duration and amplitude sufficient for pressure to be applied relatively uniformly to the geologic structure to induce fractures in the portion of the geologic structure;
   wherein generating the acoustic wave comprises generating a spark discharge within the fluid to form an expanding gas bubble that exerts pressure on the fluid to generate the acoustic wave; and
   wherein the spark discharge is generated by energizing electrodes for a length of time greater than about 100 µs and at an energy of greater than about 1 kJ per pulse.

9. A method as in claim 1, further comprising, repeating the generating at a frequency below about 10 Hz.

10. A method as in claim 1, wherein the generating comprises generating an electrical discharge within the fluid wherein a current of the discharge squared is greater than 3% of a peak value of the current of the discharge squared for more than 100 μs.

11. A method as in claim 1, further comprising injecting an agent into the fluid medium, the agent being selected to improve flowability of a material present in the geologic structure.

12. A method as in claim 11, wherein the agent comprises a chemical additive.

13. A method as in claim 12, wherein the chemical additive is an agent for inducing rock fracture.

14. A method as in claim 13, wherein the additive comprises steam.

* * * * *